United States Patent [19]

Vanaschen et al.

[11] Patent Number: 5,021,075
[45] Date of Patent: Jun. 4, 1991

[54] DEVICE FOR TEMPERING BY CONTACT OF GLAZINGS

[75] Inventors: Luc Vanaschen, Eupen, Belgium; Hans-Werner Kuster, Aachen; Carsten Bremer, Wassenberg, both of Fed. Rep. of Germany

[73] Assignee: Saint-Gobain Vitrage International, Courbevoie, France

[21] Appl. No.: 544,103

[22] Filed: Jun. 22, 1990

[30] Foreign Application Priority Data

Jun. 22, 1989 [FR] France ............................. 89 08311

[51] Int. Cl.⁵ ........................................... C03B 27/04
[52] U.S. Cl. ..................................... 65/287; 65/289; 65/351
[58] Field of Search .......... 65/114, 115, 103, 287–290, 65/350, 351

[56] References Cited

U.S. PATENT DOCUMENTS

| 3,600,150 | 8/1971 | Rougeux | 65/289 X |
| 3,694,182 | 9/1972 | Akfirat et al. | 65/288 |
| 4,723,983 | 2/1988 | Erdmann et al. | 65/289 X |
| 4,767,439 | 8/1988 | Reunamäki | 65/351 |
| 4,773,926 | 9/1988 | Letemps | 65/351 X |
| 4,826,522 | 5/1989 | d'Iribarne et al. | 65/351 X |

Primary Examiner—Robert L. Lindsay
Attorney, Agent, or Firm—Oblon, Spivak, McClelland, Maier & Neustadt

[57] ABSTRACT

A device for tempering of a glazing by contact has two cooled compression plates and a device for cooling the peripheral surface of the glazing by air jets. The device intended to cool peripheral surfaces of the glazing consists of parallelepipedic blowing ramps placed between cooling and compression plates and in which are provided slots for the cooling air jets directed toward the peripheral surface of the glazing, and exhaust openings placed between the slots. The slots have a diameter at least equal to 1 mm and at most equal to the thickness of the glazings, and the exhaust openings having a cross section which is at least three times that of slots. The dimensions of the cooling and compression plates, as well as arrangement and/or width (B) of the ramps are such that a distance (A) between the orifices of outlet slots and peripheral surface of glazing which is opposite to it is at least two times and at most six times the diameter of the slots.

10 Claims, 3 Drawing Sheets

DEVICE FOR TEMPERING BY CONTACT OF GLAZINGS

BACKGROUND OF THE INVENTION

1. Field of the Invention

This invention relates to a device for tempering of a glass sheet by contact to produce reinforced edge stresses, the sheet also optionally undergoing bending by such contact. The invention applies particularly to the production of glazings tempered thermally, which are flat or curved and intended, for example, for motor vehicles.

2. Background of the Related Art

Usually, the heat tempering of glazings is performed by blowing cold air on both faces of glass sheets previously heated to a suitable temperature. In some cases, however, it can be more advantageous to perform a so-called "tempering by contact" by placing the glazings in direct surface contact with compression plates cooled, for example, with water, i.e., plates of the compression plate or compression mold type. The direct contact with the compression and cooling plates makes it possible to prevent deformation or warping of the glazing which at times appear when the glazing is held only along its edges and/or on a single side during tempering.

The tempering by contact process also can be advantageous for the production of bent and tempered glazings of very thin glass. The thin glass cools very quickly and when, according to the conventional bending-tempering processes, the glass sheet first is bent before being transferred to the tempering station by blowing of cold air, the cooling of the glass during the transfer can be such that its temperature is then insufficient for a quality heat tempering. The use of compression plates consisting of molds whose shape corresponds to that desired for the glazing makes it possible to eliminate the transfer, since bending and tempering of the glazing is performed in a single operation.

From patent application EP-A 277 074, it is known to reduce the fragility of the edges in the glazings tempered by contact in the usual way, such as that of FR-A 1 580 305, by creating a temperature difference between the edges and the center of the glazing, particularly by blowing a cooling gas on the edges of the glazing. There, a device is described in which the peripheral surfaces of the glazings are cooled by air jets while the operation of tempering by contact continues. Still according to EP-A 277 074, these air jets are produced by tubular ramps placed parallel to the edge of the glass, outside of the cooling and compression plates. These ramps are provided with outlets having slots for the emission of air jets.

This blowing of cold air on the peripheral surfaces allows three configurations which can be considered for the compression and cooling plates and the glazing: (1) the glazing can be larger than the plates, so that its ends project beyond the plates; (2) it can be of the same size as the latter with a peripheral surface which is even with the plates; (3) it can be smaller than the plates so that the peripheral surface of the glazing to be cooled by the air is set back relative to the lateral delimitation surfaces of the cooling and compression plates. In the third case, a groove is formed whose base surface consists of the peripheral surface of the glazing.

Also known from patent application DE-A 1 771 790 is a device for tempering by contact with compression plates, in which the first plate consists of a rigid metal plate cooled with water and the other plate is formed from a housing closed by a heat-resistant fluid tight membrane, which can be fed by pressurized water and whose membrane surface establishes contact with the glazing.

In this case also, the compression plates are larger than the glazings. The cooling of the peripheral surfaces of the glazings are then performed by the fact that the glazings are beveled on the side which is applied against the membrane so that the cooled membrane can be applied to the beveled surface. Such a beveling of the edges of the glazings cannot be achieved, however, in the case of automobile glazings.

For various reasons, this technique often proves more economical since a single set of the cooling and compression plates are suitable for glazings of various sizes but of the same radius of curvature. On the other hand, it is easier to obtain reinforced edge stresses with cooling and compression plates larger than the glass sheet because then the intensity of the blowing on the edges can be fairly weak, while with plates smaller than the glass sheet the blowing must also temper the marginal zones of the glazing which are not covered by the cooling plates. It is advantageous for the tempering by contact to use devices comprising compression plates larger than the glazings to be tempered. The known devices, however, do not make it possible to achieve a satisfactory state of tension of the glazings, either in the immediate vicinity of their edges or over their entire peripheral surface.

SUMMARY OF THE INVENTION

The invention has as an object to improve a device of the type described in EP-A 277 074 so that it makes possible a satisfactory tempering of the glazings over their entire surface, to produce a reinforced edge stress.

The device for tempering by contact according to the invention comprises two cooling and compression plates between which are placed parallelepipedic blowing ramps. The ramps comprise slots for the cooling air jets directed toward the peripheral surface of the glazing. Between these blowing slots are air exhaust openings. The slots have a diameter at least equal to 1 mm and at most equal to the thickness of the glazing, and the openings each have a cross sectional area which is at least 3 times that of the slots. The dimensions of the cooling and compression plates as well as the arrangement and/or the width of the ramps is such that the distance between the orifices of the slots and the facing peripheral surface of the glazing which is opposite to them is between 2 and 6 times the diameter of said slots.

According to the invention, the parallelepipedic blowing ramps close the intermediate space between the two compression and cooling plates and provide ducts with dimensions defined for the emission of cooling air jets and exhaust ducts with dimensions also defined for the heated air flowing back from the peripheral surface of the glazing. This arrangement thus offers constant and controlled conditions for the air cooling of the peripheral surface of the glazing. In this way and due to the dimensioning according to the invention, sections of the blowing slots and the exhaust openings, as well as the distance between the exhaust openings and the peripheral surface of the glazing, the conditions which guarantee an optimum state of tempering in the marginal area of the glazing, and in particular in the area of its peripheral surface, may be established.

The blowing slots and the exhaust openings advantageously are placed in alternating sequence. In this case, the section of an exhaust opening preferably is equivalent to approximately four times that of a blowing slot.

In case the slots and the exhaust ducts cannot alternate in an exact manner, it is necessary that the sum of the sections of the exhaust ducts be equivalent to at least three times and preferably four times the sum of the sections of the outlet slots.

The blowing ramps consist, for example, of individual sections, which, if necessary, are assembled while leaving a small gap in a peripheral outlet bar. Preferably, however, the blowing ramps constitute a frame closed all around the glazing which thus is contained totally in a housing defined, by the cooling plates and by the frame that the blowing ramps constitute. The air exhaust openings are the only communications with the outside.

DETAILED DESCRIPTION OF THE PREFERRED EMBODIMENTS

Figure 1:
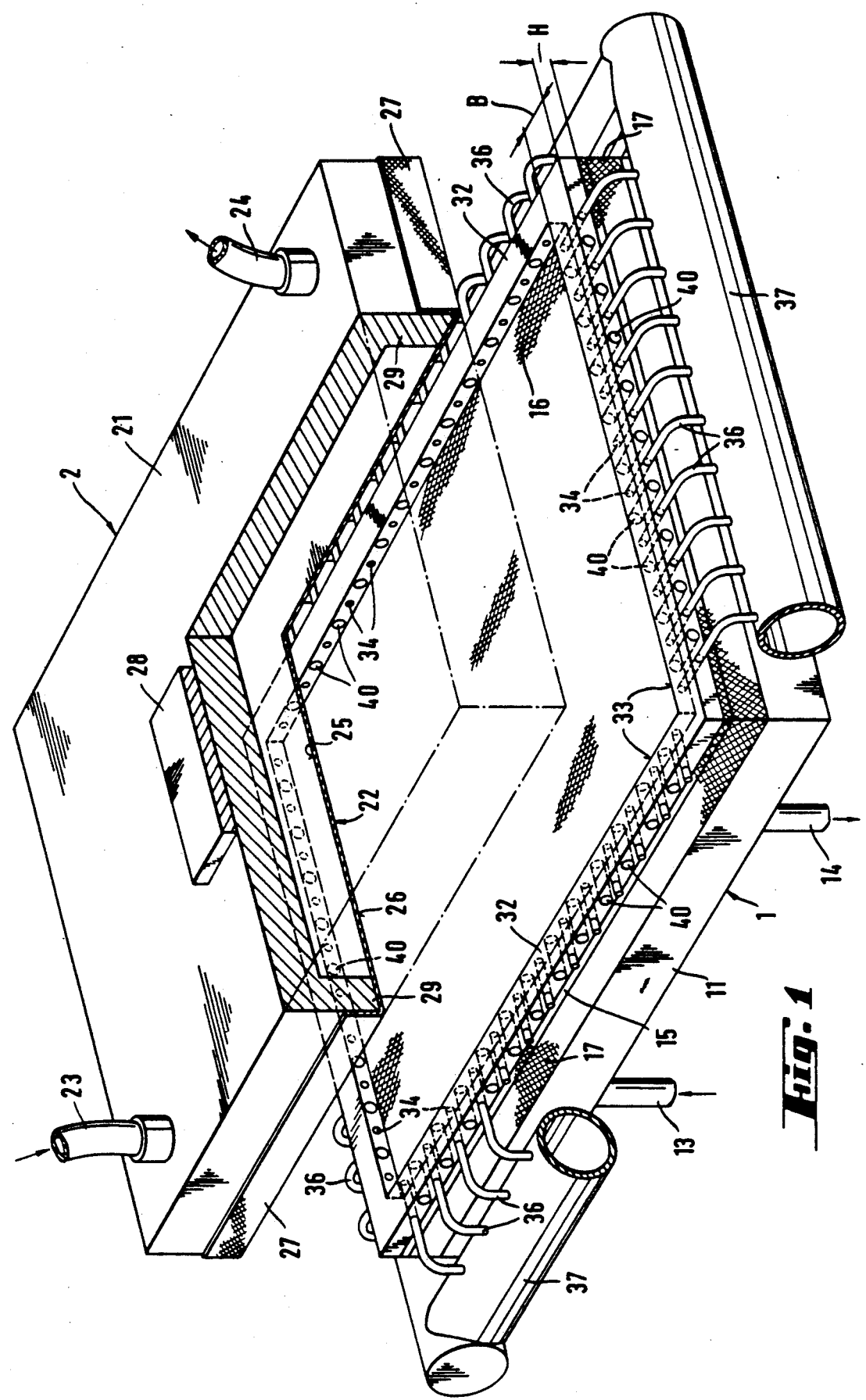
FIG. 1 is a perspective view, partially cut away, of an embodiment of a device for tempering by contact according to the invention.

For simplicity, the embodiment shown in FIG. 1 shows a device for the production of glazings tempered flat, i.e, a device in which the contact surfaces of the two cooling and compression plates are planar. However, it is possible to produce cooling and compression plates in the form of molding plates with a curved contact surface, so that the glazings can be bent and tempered simultaneously via the molding plates.

The device comprises a rigid lower cooling and compression plate 1 and an upper cooling and compression plate 2 having a flexible contact surface. Lower cooling and compression plate 1 is formed of a metal plate 11 of a metal with good heat conductivity, such as copper or aluminum. Metal plate 11 is equipped with ducts 12 in which the cooling water passes. The cooling water is admitted by a feed pipe 13 and is evacuated by pipe 14. On the compression surface of the metal plate is provided a layer 15 of an elastically deformable material having a heat transmission resistance which is preferably between $0.1 \times 10^{-3}$ and $0.25 \times 10^{-3}$ m$^2 \times$K$\times$W$^{-1}$, i.e., with good heat conductivity properties. This layer 15 has the task of providing an optimal contact with the entire surface of the glazing. It advantageously has a thickness of about 1 to 2 mm and can, for example, have a flake graphite base. Such a material is marketed, for example, under the trademark SIGRAFLEX. On elastic layer 15 is placed a thin metal gauze 16, whose marginal areas 17 are attached to the peripheral faces of metal plate 11. Metal gauze 16 forms a mechanical protection layer for elastic layer 15 and assures the attachment of this elastic layer 15 to metal plate 11. Metal gauze 16 is in this case a gauze with very fine mesh which, in the direction perpendicular to its surface, should have a low heat transmission resistance preferably between $0.25 \times 10^{-3}$ and $5 \times 10^{-3}$ m$^2 \times$K$\times$W$^{-1}$, and whose thickness preferably is between 0.1 and 0.3 mm. Metal gauze 16 can, for example, be made of fibers of an iron-chromium-nickel alloy or a chromium-nickel alloy with high heat-resistance. Metal plate 11 is suitably attached to a support 18.

Upper cooling and compression plate 2 consists of a metal housing 21 closed in a fluidtight manner at its lower part by a flexible membrane 22 and filled with a cooling liquid, such as water. The water is introduced under a regulated pressure and at a regulated flow rate by feed pipe 23 into housing 21 and discharged from housing 21 by pipe 24. A pressure regulation device, not shown, maintains the necessary internal pressure in housing 21, i.e., on the order of 5 bars, only when the press is closed, i.e., when flexible membrane 22 is applied against glazing 30. Flexible membrane 22 should offer a low heat transmission resistance whose exact value depends on the thickness of the glazing to be tempered. For a glazing thickness of 3 mm, for example, the heat transmission resistance of the flexible membrane should be less than $1.6 \times 10^{-3}$ m$^2 \times$K$\times$W$^{-1}$. Moreover, the constituent material of the flexible membrane should exhibit a good heat conductivity as well as a good resistance to the heat. A layer structure consisting of a film 25 of 0.1 to 0.2 mm thickness of polytetrafluoroethylene, which is covered on its outer face by a metal gauze 26, has proven satisfactory. Metal gauze 26 is in this case the same thin metal gauze of 0.1 to 0.3 mm thickness which is used to cover elastic layer 15 in lower compression mold 1. Marginal areas 27 of film 25 and metal gauze 26 are attached laterally to metal housing 21. Metal housing 21 is mounted on a support 28. Supports 18 and 28 form part of a press which is otherwise not shown.

Blowing ramps 32 are placed around the glazing, in the intermediate space between the two cooling and compression plates. These ramps 32 thus form a continuous framing around the glazing and are mounted on rigid plate 1, all along the circumference of this plate. The frame is formed from an outlet bar of a suitable metal, for example, of corrosion-resistant steel, having a height H corresponding to the thickness of glazing 30. Width B of ramps 32 is not, in principle, critical; it should be chosen, however, so that distance A between inner surface 33 of the ramp on which the orifices of slots 34 are located, and peripheral surface 35 of glazing 30, is equivalent to two to six times the diameter of slots 34. Slots 34 are connected by pipes 36 to a distribution pipe 37 which is connected by pipes, not shown, to a suitable power blower which provides the air necessary to the cooling of the peripheral surface of the glazing. Slots 34 are spaced, for example, 10 to 25 mm from one another and have a diameter which is at least 1 mm and is less than the thickness of glazing 30.

Between any two adjacent slots 34, there is an opening 40 of larger section than the slots which extends parallel to the slots and which is used as the exhaust opening for the blowing air. The cross section of each exhaust opening is equivalent to about four times that of a slot 34; since the thickness of ramp 32 is the same as that of glazing 30, the exhaust openings are, if necessary, in the form of elongated slots.

Figure 2:
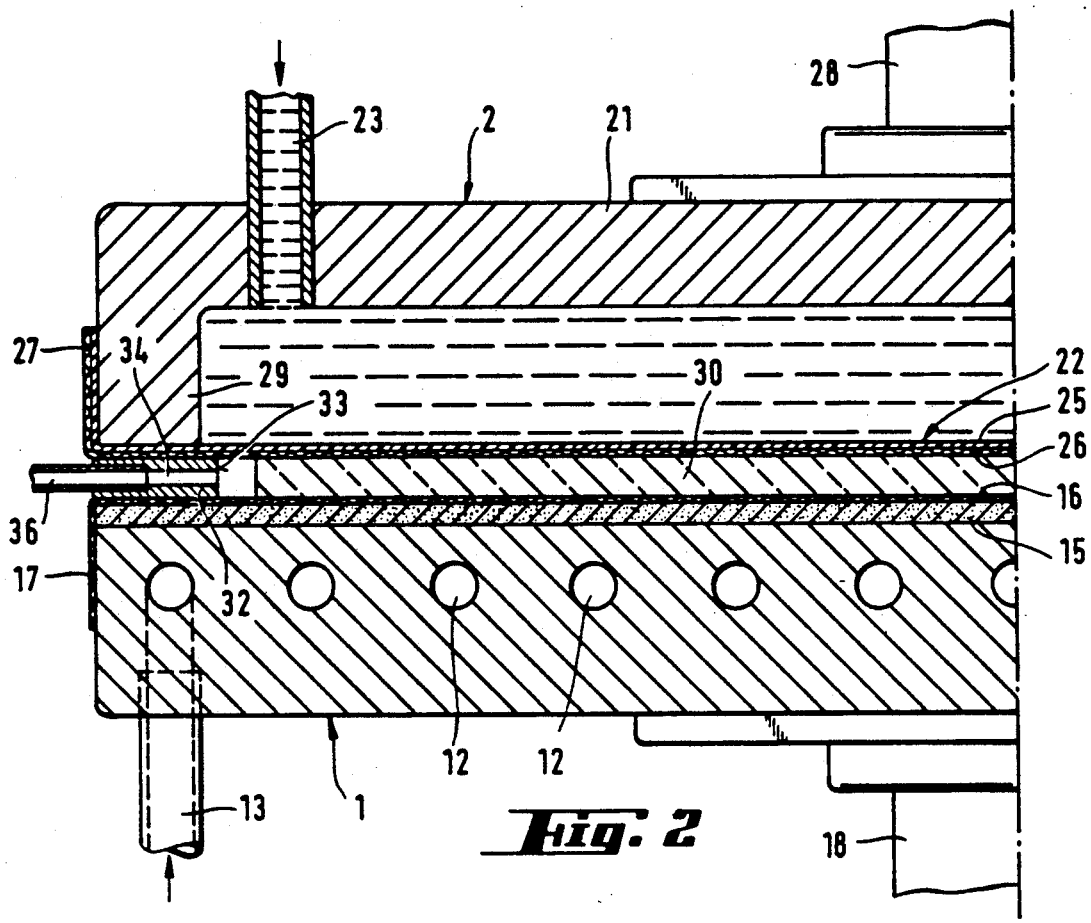
FIG. 2 is a view in vertical section of the device shown in FIG. 1, the cooling and compression plates being in closed position.
Figure 3:
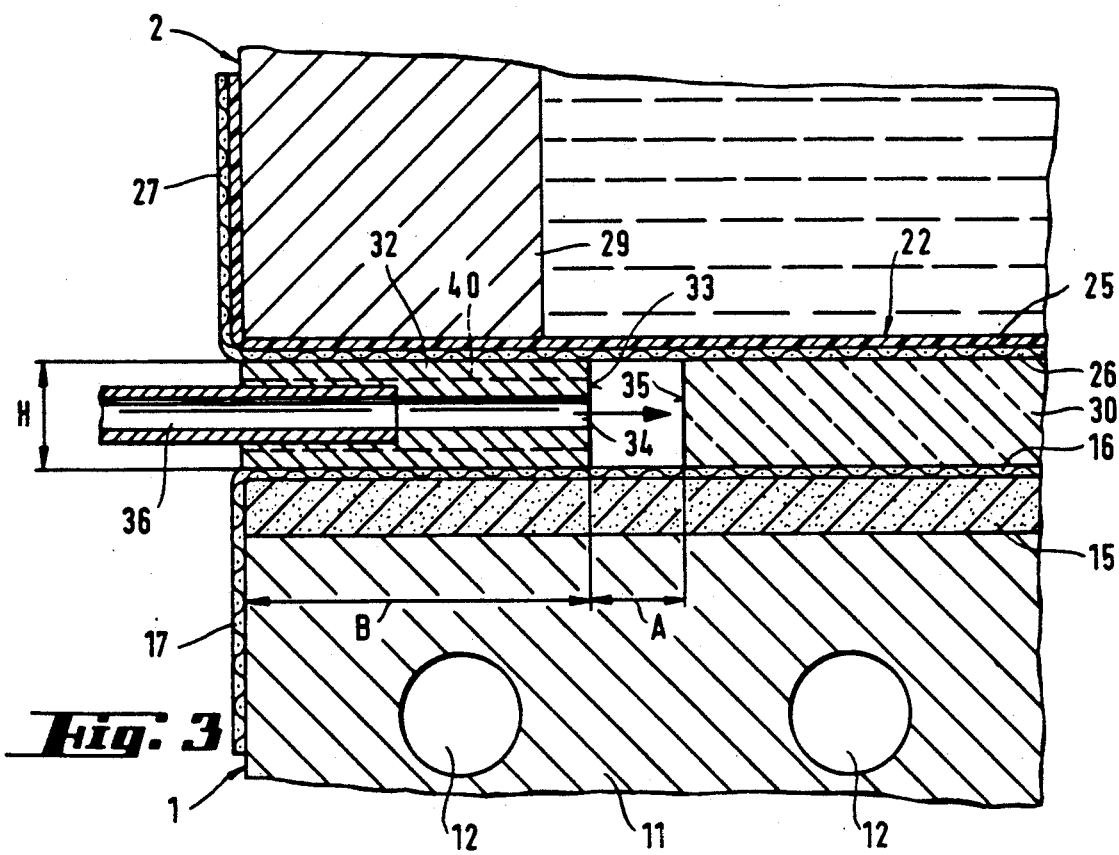
FIG. 3 is a view, in larger scale, of a fragment of FIG. 2.

In the case of the embodiment illustrated in FIGS. 2 and 3, the dimensions of housing 21 of the upper plate are selected such that the cross section of the hollow inside of housing 21 filled with cooling water is larger than the surface of glazing 30, so that flexible membrane 22 extends beyond peripheral surface 35 of the glazing. In the region of distance A between the peripheral surface of glazing 30 and inner surface 33 of ramps 32, flexible membrane 22 is not supported. In this embodiment, it therefore is desirable that distance A has a value which is close to the lower limit of the range according to the invention. Otherwise, the flexible membrane is more exposed to the risk of being subjected to too high a mechanical load under the pressure of the cooling liquid.

Figure 4:
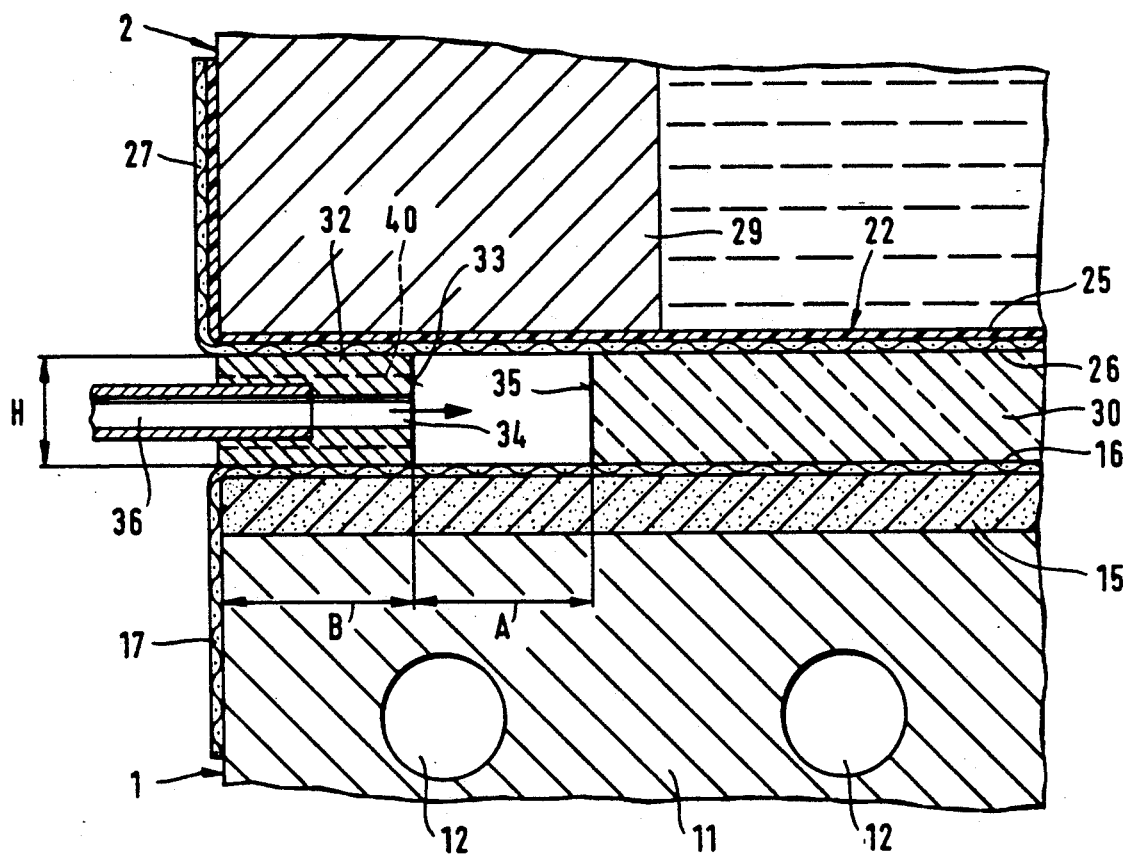
FIG. 4 is a view, also in vertical section, of another embodiment of a device according to the invention.

To prevent this type of mechanical stress of the flexible membrane, an embodiment as is shown in FIG. 4 can be selected. In this case, the dimensions of the housing forming the upper compression plate are selected so that the inside diameter of the housing is less than the corresponding dimensions of the surface of glazing 30, so that side walls 29 rest on glazing 30. In the area fed with pressurized water, flexible membrane 22 is supported on its entire surface by glazing 30. In this embodiment also, the cooling effect produced by the cooling by contact and by the simultaneous air cooling is sufficient, in the immediate marginal area of the glazing, to produce a satisfactory tempering in the area of peripheral surface 35 and in the adjacent marginal areas.

Obviously, numerous modifications and variation of the present invention are possible in light of the above teachings. It is therefore to be understood that within the scope of the appended claims, the invention may be practiced otherwise than as specifically described herein.

What is claimed as new and desired to be secured by letters patent of the United States is:

1. A device for tempering a glazing by contact, comprising:
   two cooled compression plates between which the glazing can be held; and
   a device for cooling the peripheral surface of the glazing held between said compression plates, said device comprising parallelepipedic arrangement of blowing ramps placed between said cooling and compression plates, said ramps having slots oriented for directing cooling air jets toward the peripheral surfaces of the glazing, and exhaust openings placed between adjacent pairs of said slots, said slots having a diameter of at least 1 mm and at most equal to the thickness of the glazings, the exhaust openings having a cross section which is equal in area to at least three times that of said slots, wherein said compression plates and said ramps are dimensioned such that a distance between outlet orifices of said slots and the facing peripheral surface of the glazing is between two times and six times the diameter of each of said slots.

2. A device according to claim 1, wherein the cross sectional area of said exhaust openings to about four times that of said slots.

3. A device according to claim 1 or 2, wherein the distance between the outlet orifices of said slots and the facing peripheral surface of the glazing is between three and four times the diameter of the outlet slots.

4. A device according to any of claims 1 or 2, wherein said slots are spaced 10 to 25 mm from one another.

5. A device according to any of claims 1 or 2, wherein said blowing ramps form a closed frame surrounding the glazing.

6. A device according to any of claims 1 or 2, including pipes connected between a cold air distribution system surrounding a lower one of said plates and each of said slots.

7. A device according to claim 1, wherein a lower one of said plates comprises a rigid metal plate and an upper one of said plates comprises a metal housing which is closed by a flexible membrane and has means for feeding pressurized water thereto.

8. A device according to claim 7, wherein rigid metal plate is provided with a coating comprising an elastically flexible layer whose heat transmission resistance is between $0.1 \times 10^{-3}$ and $0.25 \times 10^{-3}$ $m^2 \times K \times W^{-1}$.

9. A device according to claims 7 or 8, wherein said membrane is formed of polytetrafluoroethylene of a thickness of 0.1 to 0.4 mm and a heat transmission resistance between $0.25 \times 10^{-3}$ and $5 \times 10^{-3}$ $m^2 \times K \times W^{-1}$.

10. A device according to claim 7, wherein said elastically flexible layer and said film each are covered by a thin metal gauze which has a thickness of 0.1 to 0.3 mm and, in the direction perpendicular to their surface, a heat transmission resistance between $0.25 \times 10^{-3}$ and $5 \times 10^{-3}$ $m^2 \times K \times W^{-1}$.

* * * * *